Jan. 19, 1965 A. G. WEIL ETAL 3,165,901

ICE MAKING AND CRUSHING APPARATUS

Filed April 27, 1961 3 Sheets-Sheet 1

INVENTORS:
Albert G. Weil
Walter A. Zeuschner
By Gary, Desmond & Parker
Attys

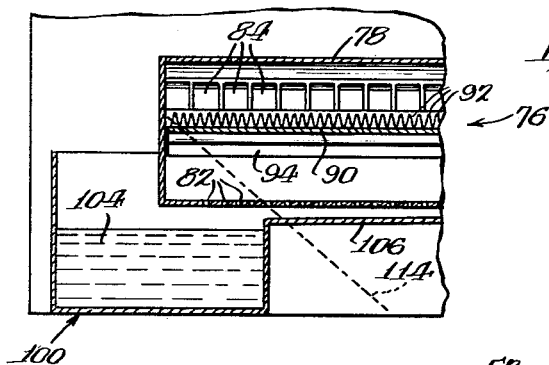
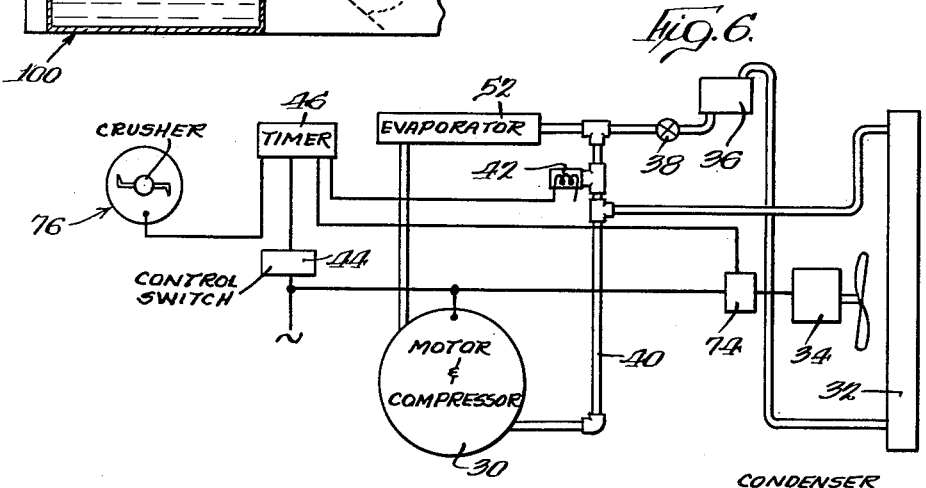
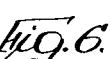
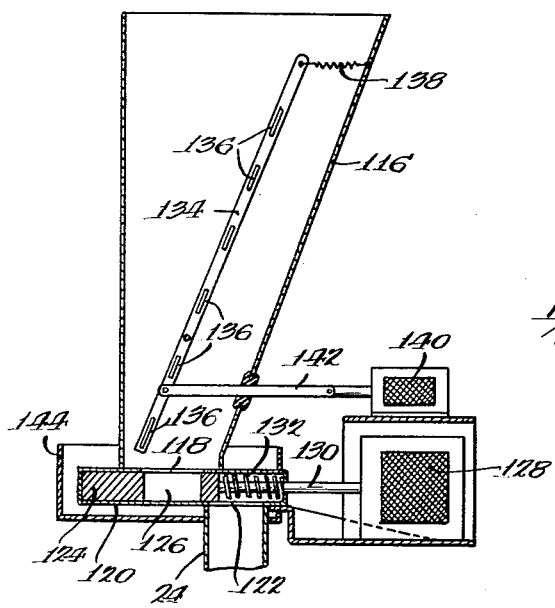

United States Patent Office 3,165,901
Patented Jan. 19, 1965

3,165,901
ICE MAKING AND CRUSHING APPARATUS
Albert G. Weil and Walter A. Zeuschner, Chicago, Ill., assignors to Remcor Products Company, Chicago, Ill., a corporation of Illinois
Filed Apr. 27, 1961, Ser. No. 105,999
11 Claims. (Cl. 62—138)

The present invention relates to icemakers, and particularly, to improvements in apparatus for making, crushing and dispensing ice.

This application is a continuation-in-part of our application Serial No. 66,637, filed November 1, 1960, now abandoned.

A popular form of coin-controlled vending machine comprises apparatus for selectively dispensing into paper cups any of a variety of cold beverages, each of which consists of predetermined quantities of a flavor concentrate and water. To render the drink cold, it is common practice to refrigerate the water employed, but recently it has been proposed to also provide means for forming and discharging into each cup or drink dispensed a predetermined quantity of crushed ice. With apparatus currently available, the ice dispensed is in the form of either very thin flakes of ice, or small pieces of highly porous, soft ice, both of which are more similar to snow than to ice. The same is true of apparatus employed in restaurants and the like for making crushed ice. While these forms of ice do tend to cool the beverage, they melt rapidly and cause excessive dilution of the drink. Also, the ice imparts a cloudy, undesirable appearance to the beverage.

The object of the present invention is to provide improvements in apparatus for making crushed ice, and in particular, to provide apparatus for producing pellets of hard, clear ice of the highest quality.

Specifically, it is an object of this invention to provide improved apparatus for making crushed ice characterized by an inclined freezer plate, means for continuously flowing water downwardly over the plate for the formation thereon of a relatively thick slab of hard clear ice, means operative upon formation of a slab of ice for releasing the slab for gravitational descent along said plate, and a crusher extending along the lower edge of said plate for crushing the slab into bite-sized pellets as it gravitates into the crusher.

Another object of the invention is the provision of an improved crusher comprising a generally cylindrical housing having a slot along one of its sides for passage therethrough of a slab of ice and a longitudinal row of bite-sized openings along its opposite side, a shaft journalled substantially axially in said housing, teeth projecting from said shaft toward the wall of said housing for breaking the slab of ice into pellets, and a wiper on said shaft engaging the wall of said housing for impelling the pellets of ice toward said openings for discharge therethrough, said openings controlling the maximum size of the pellets discharged.

It is also an object of the invention to provide improved means for sensing the formation of a slab of ice on the freezer plate and for setting into operation the means for releasing the same, said sensing means comprising a tube having an inlet end disposed adjacent but above the plate, said tube having an inlet in said end facing in the direction opposite the direction of water flow, said tube extending away from said plate and having an outlet spaced from the plate, and control means in said tube adjacent said outlet for sensing the passage of water therethrough for controlling the icemaker independently of the ambient temperature immediately adjacent the plate.

It is an additional object of the invention to provide improved safety means for ice makers including second ice and/or water sensing means spaced above the freezer plate and above the first-named sensing means, and control means associated with the second sensing means and coupled in parallel with the control means of the first sensing means for controlling the icemaker in the event of any malfunction in its normal operation.

A further object of the invention is the provision in combination with the above described apparatus of a dispenser including a storage hopper for pellets of ice, means operable on order for dispensing a predetermined quantity of the ice pellets, and means for agitating the ice in the hopper to insure dispensing of a full charge of ice.

A still further object of the invention is the provision of an icemaker comprised of the elements above described that is constructed in a most compact and economical manner and that includes means for conserving water, even water of condensation, thereby to avoid any problem of water disposal.

Other objects and advantages of the invention will become apparent in the following detailed description.

Now, in order to acquaint those skilled in the art with the manner of making and using our improved icemaker, we shall describe, in connection with the accompanying drawings, a preferred embodiment of the icemaker and the preferred manner of making and using the same.

In the drawings:

FIGURE 5 is a fragmentary transverse section taken substantially on line 5—5 of FIGURE 4;

FIGURE 6 is a schematic representation of the refrigerant and electric circuits of our improved apparatus; and FIGURE 7 is a vertical sectional view of the preferred embodiment of our crushed ice dispenser.

Figure 1:
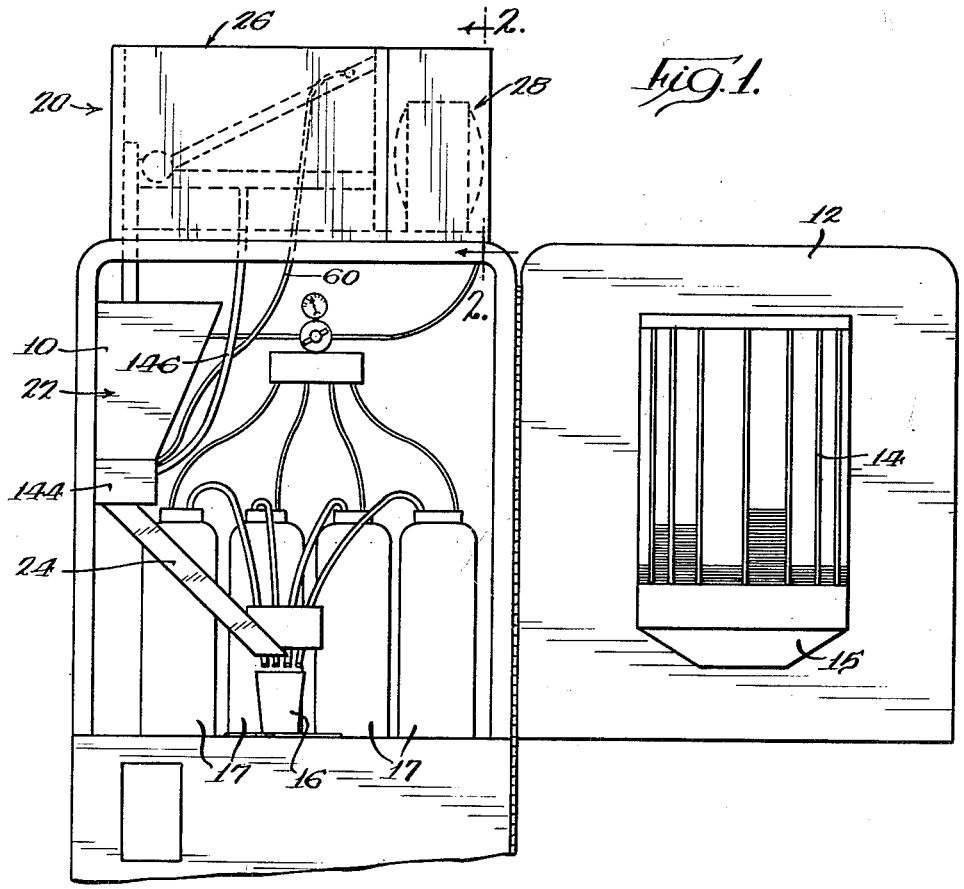
FIGURE 1 is a front elevational view of the interior of a beverage dispenser equipped with the icemaking, crushing and dispensing apparatus of our invention.
Figure 2:
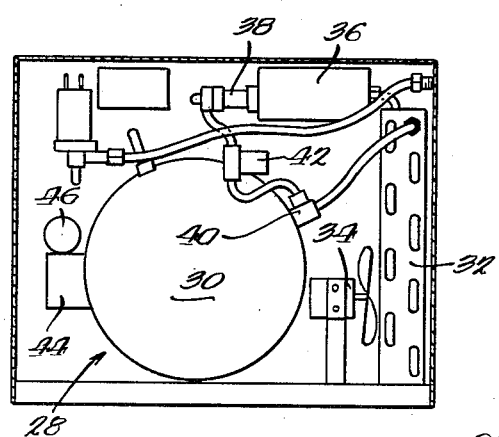
FIGURE 2 is an end elevation of the icemaker showing the operating components thereof.

Referring now to the drawings, we have shown in FIGURE 1 a preferred embodiment of our icemaking, crushing and dispensing apparatus associated with a conventional beverage dispenser comprising a cabinet 10 having a hinged front door 12 on which is mounted a rack 14 for storage of a plurality of paper cups. At the bottom of the rack, there is provided the customary apparatus 14 for discharging cups one by one in an upright position down a chute to a cup-filling station 16. Disposed within the cabinet are a plurality of syrup or concentrate containers 17 and the customary valves for supplying measured quantities of syrup from a selected container to the cup at the cup-filling station 16. Also, there are valves for controlling a water supply line for supplying a predetermined quantity of water to each cup as the concentrate or syrup is being supplied thereto. As is well-known in the art, all of these operations occur automatically in proper sequence whenever a person drops an appropriate coin in the machine and makes a selection of a beverage.

The object of the present invention is to provide in a machine as described apparatus for making and supplying crushed ice to the cup at the cup-filling station during each operation of the machine. More particularly, it is the object of the invention to supply to each cup a measured quantity of pellets of hard clear ice of high quality. For this purpose, we mount an icemaking assembly on or in the cabinet, the assembly including an icemaker 20 mounted in this instance on top of the cabinet and a dispenser 22 extending downwardly into the cabinet and having a dispenser chute 24 extending down to the cup-filling station 16 of the beverage dispensing machine.

The icemaker 20 is illustrated in its preferred embodiment in FIGURES 2 to 6, and as there shown, is comprised of a generally cubical refrigerating cabinet 26, and an operating assembly 28. For purposes of compactness of the unit in the environment depicted in FIGURE 1, the assembly 28 is mounted directly on one end wall of the cabinet 26. The operating assembly 28 includes means for circulating refrigerant and comprising a combined electrically operated motor and compressor unit 30, an air-cooled condenser 32 into which the compressor discharges, an electric motor operated fan 34 for forcing cooling air through the condenser, a receiver 36 into which the condenser discharges, a conventional refrigerant metering means 38 such as an expansion valve or a capillary tube, disposed in the line leading from the receiver to an evaporator (which will be described later), a return from the evaporator to the compressor 30, a hot gas by-pass conduit 40 extending from the compressor outlet to the evaporator inlet, and a solenoid valve 42 controlling said by-pass. For controlling the refrigerating means, the assembly 28 also includes a control switch 44 and an electric timer 46, the functions of which will be described hereinafter.

Figure 3:
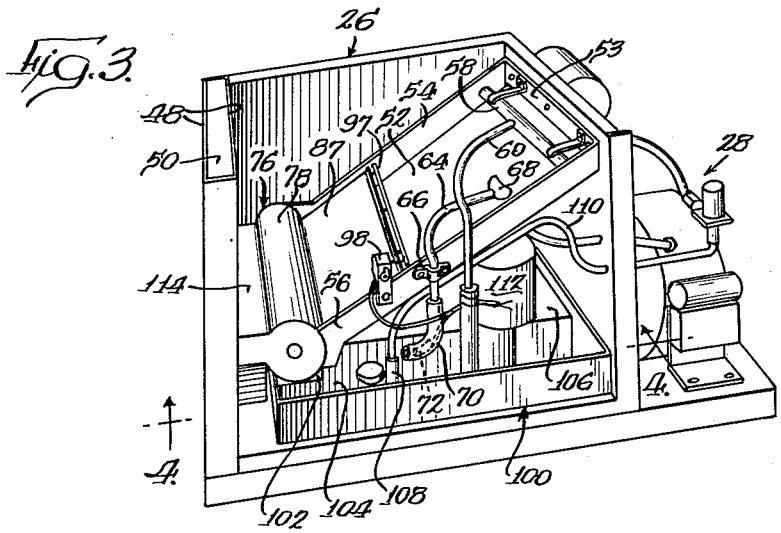
FIGURE 3 is a perspective view of the interior of the refrigerating compartment of the icemaker.
Figure 4:
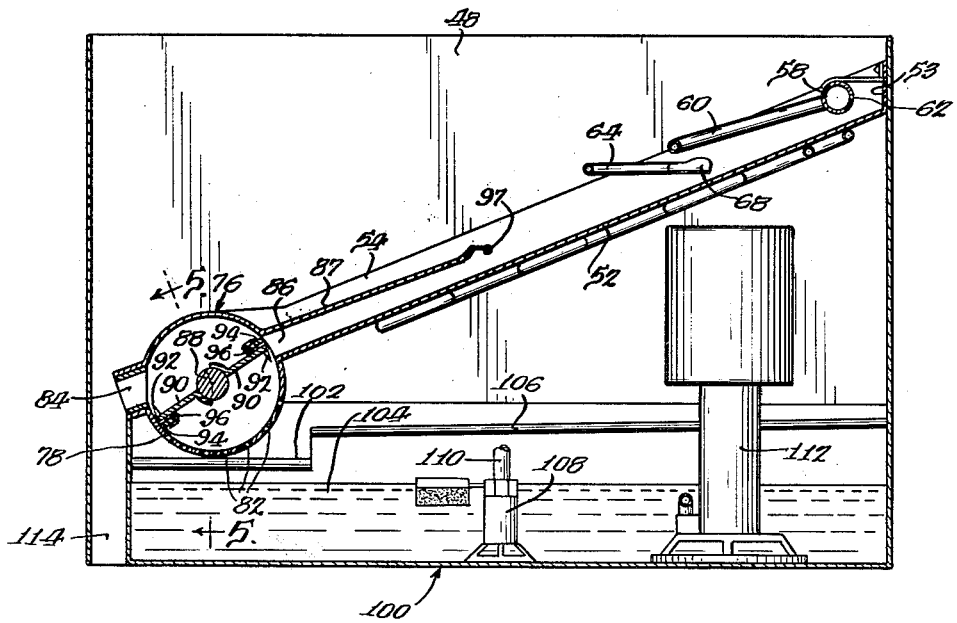
FIGURE 4 is a longitudinal sectional view of the interior of the refrigerating compartment.

The cabinet 26 and its contained elements are shown particularly in FIGURES 3 and 4. The cabinet itself may comprise generally concentric metal boxes 48, one fitted into the other with a layer 50 of foam insulating material therebetween. Mounted within the upper portion of the inner box is an inclined freezer plate 52 having a smooth, flat upper surface and having a lower surface mounting or forming an evaporator coil over the major portion of the plate. Heretofore, the art has made a fetish of forming the freezer plate of two metals or materials of different heat conductivity, namely a major portion or freezing area of high heat conductivity and at least upper and lower edge portions of relatively low heat conductivity defining boundaries to said freezing area. In contrast, we have found that our freezer plate may be comprised of a single material (preferably of high heat conductivity) and that we can define thereon a restricted or bounded freezing area, which leads to many advantages as will appear. The plate 52 is secured to the inner one of the boxes 48 by fasteners extending through upstanding legs or flanges 53 and 54 provided along the top and one side of the plate. An upright flange 56 is also provided along the opposite or free side of the plate. As shown, the plate is suitably disposed at an inclination of about 20 to 30 degrees to horizontal and the upper end thereof is secured to the same wall as the operating assembly 28, whereby the conduits comprising the inlet and the outlet of the evaporator coil may be disposed entirely beneath the plate without interfering with other components of the icemaker.

Extending across the plate 52 adjacent and parallel to the upper edge thereof is a waterheader 58 comprising a tube suitably mounted on the cabinet or the plate, such as by bracket secured to the flange 53. This header is supplied by an inlet tube or pipe 60 extending radially forward from the header, then outwardly over the free edge portion 56 of the plate 52, and then downwardly below the plate. Along its rearward edge portion, the header 58 is provided with a longitudinally extending row of radial outlet ports 62 by means of which water is discharged or sprayed from the header against the top edge portion of the plate 52, or against the upper edge supporting flange 53. As the water is sprayed against the flange, it is distributed uniformly over the entire width of the freezer plate and commences to flow downwardly over the upper surface of the plate. In addition to the advantage of uniform water distribution, the location and construction of the header result in shortening of the overall length of the freezer assembly.

Water is supplied continuously to the header 58 throughout the refrigerating cycle whereby a uniformly distributed film of water flows continuously over the whole surface of the plate. The plate, due to its conductivity and the evaporator coils thereon, gradually freezes the water from the bottom up, and this results, especially due to the continuous passage of water, in the formation on the upper surface of the plate of a slab of hard, crystal-clear ice of the highest quality.

To control the thickness of the slab of ice formed on the plate, we provide improved control means comprising a tube 64 having a vertical portion secured by a bracket 66 to the outer side of the flange 56, the tube extending upwardly from the bracket, inwardly over the flange 56 and the plate 52, then rearwardly in a generally horizontal plane toward the upper edge portion of the plate and terminating at its rearward end in a horizontally expanded inlet section 68 defining an inlet port facing in the direction opposite the direction of water flow. By virtue of the horizontal extension of the tube from the bracket 66, the inlet end portion of the tube may be flexed or bent in a vertical plane to vary the distance between the upper surface of the plate 52 and the inlet port of the tube. In this manner, the control means may be adjusted for formation of a slab of ice of desired thickness. Generally, it is the object of this invention to form a thick slab of ice, not flake ice or snow, and the inlet tube is thus spaced significantly above the surface of the plate. As the ice builds up on the plate, the ice and the film of water flowing thereover raise toward the mouth of the tube until eventually the water commences flowing into and through the tube and down through the vertical portion thereof, whereby the water may be employed to perform a control function relative to the refrigerator operating assembly 28. Specifically, we connect an arcuate tubular plastic extension 70 to the lower end of the tube 64, slit the wall of the extension, and insert a sensing or control element 72, such as a thermostat, into the extension to sense the passage of water therethrough. By virtue of this arrangement, when a thermostat is employed as the control element, the thermostat is spaced from and rendered non-responsive to ambient temperature conditions adjacent the freezing surface of the plate, thereby to provide an extremely accurate control function irrespective of the frequency or paucity of freezing cycles. In our apparatus, we employ the sensing element 72 to actuate the control switch 44, which initiates the below-described cycle of machine operation.

As shown in FIGURE 6, electric power is normally supplied to the compressor unit 30 and the condenser fan unit 34, and the valve 42 is normally closed, whereby the refrigerant circulating means normally acts to refrigerate the plate 52 and cause the formation of ice. When the sensing element 72, in response to passage of water through the tube 64, closes the control switch 44, the timer 46 is supplied with electric current to set the timer into operation for a predetermined period of time. The timer in turn energizes the solenoid valve 40 to open the hot gas by-pass 40, whereupon the hot refrigerant discharged from the compressor, in taking the path of least resistance, flows through the by-pass and directly into the evaporator coil thereby to commence a defrost cycle, or more specifically to heat the plate 52 and release the thick slab of ice therefrom. To assist in the defrost cycle, the timer may also operate to stop the condenser fan, either directly or by way of a normally closed relay 74 or the like. In addition, the timer may be employed to perform other control functions, such as to stop the supply of water to the header 58, and is specifically employed for the further function to be described below.

As defrosting of the plate takes place, the slab of ice is freed and commences to slide downwardly along the plate, and as it does so, it slides into a crusher assembly 76 extending across the lower edge of the plate.

The crusher, as shown in FIGURES 4 and 5, is comprised of a generally cylindrical housing 78 formed of upper and lower partially cylindrical components. By virtue of our aforesaid discovery of the practicality of formation of the freezer plate from a single material, we are enabled to form the plate 52, the flanges 53, 54 and 56 and the lower component of the housing 78 from a single sheet of material, preferably copper or other high heat conductivity material. The evaporator coil may be formed by a serpentine coil fixed to the lower surface of the plate proper over the major area thereof, or by passages formed in known manner between two plys of metal. By appropriate location of the coil or passages over a rectangular area the edges of which are spaced from the edges of the plate, and by securement of edge portions of the conductive plate to conductive portions of the cabinet, we find that we can effectively limit the freezing area as desired or necessary to facilitate loosening of the slab of ice and gravitational descent of the same into the crusher. Thus, we are able to roll the lower component of the crusher housing directly into the material of the plate, the housing component curving downwardly and forwardly from the plate 52 per se and then upwardly. At approximately the horizontal level of the axis of the housing 78, we provide a sizing bar, suitably formed of stainless steel, defining a longitudinal row of generally bite-sized openings 84. From approximately the plate 52 per se to the openings 84, the cylindrical wall of the lower housing component is provided with a plurality of relatively small drain holes 82 through which water flowing over the slab and into the housing is drained from the crusher assembly. Also, drain baffles may be provided adjacent the ends of the housing. The openings 84 may, for example, be about ¾ inch square and are preferably defined by a sizing bar assembly of sheet metal strips comprising spaced parallel upper and lower strips and a plurality of evenly spaced vertical partitions therebetween. The lower one of the strips is secured to the upper edge of, and constitutes part of, the lower housing element. The upper housing element is detachably secured at its forward edge to the upper one of the defined strips and extends rearwardly therefrom, i.e., toward the plate 52 over the top of the lower housing element to adjacent the plate 52, the upper element being spaced upwardly from the lower element, thereby to define a longitudinal slot 86 aligned with the upper surface of the freezer plate. Preferably, the upper element also includes a rearward extension 87 spaced above the plate for a purpose to be described. In addition to the upper and lower elements, the housing assembly includes end plates closing the opposite ends of the cylinder.

Rotatably mounted within the housing in coaxial relation thereto is a crusher shaft 88, the shaft being journalled in the end walls of the cylindrical housing 78 and extending through one of said walls for operation by an electric motor or other suitable drive means disposed exteriorly of the housing. Secured to the shaft are one or more, preferably two, longitudinally extending teeth plates or bars 90, each comprising an arcuate base portion complemental to and fixed on the shaft, a radially outwardly extending portion and an outer tooth portion which is bent forwardly from the radial portion in the direction of shaft rotation. This latter portion of each plate or bar 90 is serrated or notched, preferably V-notched, thereby to define a plurality of crusher teeth 92 (FIGURE 5). Because of the plate formation of the radial portion of each tooth bar, the bar will tend to retain pieces of ice removed by the teeth forwardly thereof, whereby said radial portion will force the small pieces in the direction of shaft rotation and toward the sizing bar and the discharge openings 84. To assist in this function, or to perform the same in the absence of a plate or bar form of tooth structure, we secure to the shaft one or more wipers 94, each of which comprises a longitudinally extending sheet of flexible material, such as nylon and each of which extends at least into close proximity to the wall of the cylindrical housing. We prefer to dispose the wipers generally radially of the shaft with the outer edges of the same just engaging the wall of the housing. If desired, however, each wiper strip may have a normal lateral dimension such that it would project further outward in the radial direction than the wall of the cylindrical housing, whereby the same would be curved back by and resiliently engage against the wall to perform the wiping function. Preferably, a wiper 94 is secured in trailing relation to each tooth bar 90 by means of a channel-shaped holder and the radial portion of the respective bar 90.

With reference to FIGURE 6, it will be appreciated that the timer 46 is operated to set the crusher shaft 88 into operation each time the timer is energized to initiate and control a defrost cycle. Thus, as the slab of ice is freed from the freezer plate 52 and commences to slide down the same, the lower edge of the slab slides through the slot 86 in the housing 78 and is contacted by the teeth 92 of the crusher, whereby the thick slab is progressively fed by gravity into, and is broken up or crushed by, the crusher teeth into particles or pellets. During crushing, the extension 87 of the housing 78 prevents upward displacement of the slab of ice, thereby to assure feed of the slab into the crusher and complete crushing of each slab. Due to the construction of the crusher teeth, the pieces of ice, while varying in size, will be generally of an approximate bite-size, or as previously stated will comprise bite-sized pellets of ice. As the crusher shaft rotates, each crusher bar 90 will tend to force the pellets of ice it has removed from the slab around the housing toward the openings 84. The wiper 94 trailing the respective bar will first engage the slab to prevent excessive feed of the same into the housing, and then will wipe the interior of the housing as it moves toward the openings 84. As the tooth bars and wipers pass the drain holes 82, any liquid water and any small, substantially worthless fragments of ice will be drained away, and only the larger desirable pellets of ice will be forced upwardly toward the openings 84. As the wiper approaches the openings 84, the pellets of bite-size and smaller will fall and are forced through the openings 84 in the sizing bar, but larger pieces will not pass through whereby the openings control the maximum size of the pellets discharged from the apparatus. Any pieces not passing through the openings will be carried around the housing by the tooth bars and will be subjected to further crushing until they can be forced through the sizing bar by the teeth and the wipers. Thus, the apparatus assures production of bite-size pellets of crystal-clear, hard ice.

The cycle of the operating assembly 28 under the control of the timer 46 is preferably such that when a slab of ice has been formed, and the sensing element 72 has actuated the control switch 44, the timer 46 first disconnects the condenser fan and discontinues water flow over the plate, second opens the hot gas by-pass, after a predetermined elapse of time closes the hot gas by-pass, stops the compressor, closes the circuit of the crusher drive motor and holds the latter circuit closed for a predetermined period of time sufficient to result in crushing of the entire slab, just prior to the end of the latter predetermined time period again causes water to flow over the plate 52 to flush residual ice into the crusher, and then stops the crusher and restarts the compressor and the condenser fan, and finally shuts itself off, whereby the operating assembly 28 is again conditioned to refrigerate the freezer plate 52 and to commence formation of a second slab of ice.

Normally, the apparatus will operate in the manner above described without failure. However, as an extra safety feature, we prefer to incorporate in our icemaker additional means for initiating the defrost or harvest cycle in the event the sensing element 72 fails to operate, the slab of ice becomes stuck between the freezer plate 52 and the crusher trough extension 87, or the slab otherwise is not fully crushed during a first harvest cycle. Specifically, we place a second water and/or ice-sensing means above the plate 52 and above the level of the tube end 68 relative to the plate. This means takes the form of a sensing tube 97 running along the free edge of the extension 87 and a thermostatic switch or like control means 98 coupled to the tube. The tube 97 is spaced upwardly from and extends across the full width of the freezer plate 52 at an elevation above the plate greater than the elevation of the tube end 68. The control means 98 is suitably mounted on the plate flange 56 and may be connected directly to the hot gas by-pass valve 42, to this valve and the crusher motor, or as shown herein it may be connected in parallel with the thermostat 72. Now, if a first slab of the aforesaid predetermined thickness is not disengaged from the freezer plate and crushed in the crusher assembly, the refrigeration system, in the absence of an initial harvest cycle on following such cycle, will cause additional ice to be formed on top of the existing ice and/or will cause water to overflow the space between the freezer plate and the extension 87. As this takes place, the ice or the cold water engages the tube 97, whereupon the thermostatic control 98, being in parallel with the control 72, will initiate the above described harvest cycle. If, at the end of the full timer cycle, the ice or feed water is still touching the safety thermostat element 97, the timer 46 will again be energized and run through its complete cycle. This will continue until the ice on the freezer plate has melted down to the point at which it will slide under the trough cover 87 and be engaged in the crusher teeth and ground up. Then the ice-sensing thermostat 72 again takes over and the normal refrigeration cycle is repeated.

During formation of ice, the water flowing over the freezer plate 52 normally flows through the slot 86 in the housing 78 and through the drain holes 82. To collect the water, a drain pan and/or reservoir structure 100 is provided below the freezer plate 52 and the crusher assembly 76. The drain structure is substantially coextensive with the plate 52 and assembly 76, but is slightly wider to project beyond the free side 56 of the plate. The structure includes a relatively shallow trough 102 underlying the full length of the crusher assembly, and particularly the drain holes 82 thereof, a relatively deep trough 104 along the free edge or side portion of the plate 52 into which the trough 102 empties, and an inclined pan member 106 underlying the freezer plate and draining into the troughs. As will be appreciated, the pan 106 collects condensate dripping from the lower surface of the freezer plate during the defrost cycle and feed this pure water into the troughs 102 and 104. In this manner, the actual holding space is kept as small as practicable, yet all of the liquid water produced by and used in the apparatus is collected for circulation or recirculation over the freezer plate.

In an icemaker assembly as thus far described, the pan 100 may directly comprise the water reservoir for the icemaker. In such case, a float-operated filler valve 108 is mounted in the trough 104, the same being connected to a water supply conduit 110 and being adapted to maintain a predetermined water level in the trough. Also disposed within the trough is an electric motor-operated pump 112 having its inlet submerged in the water in the trough and having its outlet connected to the supply pipe 60 for the waterheader or distributor 58, whereby the water is circulated from the trough over the freezer plate. As will be apparent, the motor of the pump may, if desired, be controlled from the timer 46 by way of a normally closed relay, like the relay 74.

As ice produced and crushed by the apparatus above described is discharged through the openings 84 in the crusher 76, it may be accumulated in a hopper or a tray that is manually accessible, whereby the ice may be removed by hand as in restaurant facilities. For discharging the ice to the hopper, a funnel 114 is defined by inclined metal plates in a narrow space between the outlet of the crusher and the end wall of the cabinet 26, the funnel opening through the lower wall, or the lower end portion of the end wall, of the cabinet. In automatic beverage dispensers, however, it is preferred that the ice, as well as the beverage, be automatically dispensed in measured quantities and in an entirely sanitary manner to the drinking cup. To this end, we have provided the dispenser 22, which is shown in detail in FIGURE 7. The dispenser includes an insulated hopper 116 of an inverted generally rectangular pyramidal form, the same preferably having two adjacent vertical walls to facilitate mounting of the same in the beverage dispenser cabinet or case 10 and having two downwardly and inwardly inclined walls. At its upper end, the hopper communicates with the outlet of the funnel 114 to receive ice from the crusher 76. At its lower end, the hopper terminates in a discharge opening 118, suitably of rectangular form and of predetermined size. Secured to the lower end of the hopper is a dispenser housing 120 of box-like form that is considerably longer than the width of the lower end of the hopper, the housing having in its upper wall an opening of the same size as and aligned with the opening 118. In its lower wall, the housing 120 is provided with an opening 122 that is of the same size as the opening 118, but that is offset from the opening 118 in the direction longitudinally of the housing. The opening 122, as indicated, communicates directly with the ice feed chute 24 previously described. Reciprocably mounted within the housing 120 is a measuring block 124 of predetermined thickness having an opening 126 therethrough that is of the same configuration and size as the openings 118 and 122. This block is reciprocably movable sequentially to align the opening 126 therein with the openings 118 and 122, whereby a charge of ice is measured out by the opening 126, and is delivered thereby from the hopper 116 to the chute 24. To operate the block 124, we provide a solenoid 128 including a coil structure mounted on an extension of the housing 120 and a reciprocable core having a rod-like extension 130 secured to the block. The solenoid may be double-acting to move the block in both directions of reciprocating movement, or may be single-acting to pull the block toward the solenoid and into alignment with the opening 122. In the latter case, a return spring 132 is provided for shifting the block away from the solenoid into alignment with the opening 118.

To insure that a full charge of ice is measured out by the block 124 upon each operation thereof, we also provide means for agitating the ice in the hopper immediately prior to each dispensing operation of the block. The agitator preferably comprises a rod-like element 134 pivotally mounted substantially centrally thereof within the interior of the hopper, the rod including lateral ice-breaking knives or blades 136 along its length and a biasing or return spring 138 at its upper end, the spring being anchored to the hopper. For actuating the agitator, we provide another solenoid 140, the same being mounted on top of the solenoid 128 and including a core extension 142 extending through a sealed aperture in the wall of the hopper and pivotally connected to the agitator rod. If the solenoid 140 is double-acting, it is apparent that the spring 138 may be omitted.

In use of the apparatus, we prefer that the icemaker operate independently of the dispensing mechanism, so that ice may be produced in the best possible manner. To this end, the icemaker operating assembly is disassociated electrically from the dispenser, except for the provision of a refrigerator controlling limit switch (not shown) in the hopper 116 for disconnecting the refrigerator when the hopper is substantially full of ice. The ice dispenser mechanism, however, is directly associated with the beverage dispenser mechanism and in particular includes electrical leads from the solenoids 128 and 140 connected to some suitable portions of the beverage dispenser electric circuit, such as its coin receiving mechanism, its cup dispensing mechanism, its concentrate dispensing valves and/or its timer or counting mechanism. The manner of making such connections will be obvious to those skilled in the art when it is understood that our solenoid 140 is first actuated to agitate and loosen the ice in the hopper, thereby to fill the opening 126 in the measuring block, and that the solenoid 128 is energized shortly thereafter, but subsequent to dispensation of a paper cup and prior to completion of the beverage dispensing operation, thereby to deliver the measured charge of ice down the chute 24 to the cup. Thereafter, the two solenoids are de-energized, whereupon the springs 132 and 138 return the measuring block and the agitator to their normal (illustrated) positions. If desired, the duration of actuation of the solenoid 140 may be short to effect a rapid oscillation of the agitator, thereby to improve the ice-breaking and agitating function.

When the dispenser 22 is employed and the capacity of the beverage dispenser for disposal of waste liqiud is slight, as it usually is, we prefer to install a drip-pan or collector 144 about the lower end of the dispenser housing and the hopper to collect water dripping from the same by virtue of both condensation and melting of the ice in the hopper. Such pan may serve simply as a waste collector if desired, but we prefer when using the pan 144 to have the pan 109 drain by way of a tube 146 or the like into the pan 144 and to install the float-operated water supply valve 108 and the water feeding pump 112 in the pan 144, thereby to constitute the lower pan 144 the water reservoir for the apparatus, to make use of all of the water resulting from operation of the apparatus, and to eliminate the problem of disposal of that which otherwise would be liquid waste.

From the foregoing, it is to be appreciated that we have provided apparatus for producing in quantity bite-sized pellets of hard, crystal-clear ice of highest quality, and for dispensing the ice in predetermined amounts on order. The ice is produced and crushed rapidly thereby to insure at all times an adequate supply of ice, and the ice is produced, crushed and dispensed in a highly economical manner. The apparatus we have disclosed is exceptionally compact and economical when considering the quality of the ice produced, and includes individually improved elements and improved combinations for accomplishment of the stated results and advantages. Consequently, all of the objects and advantages of the invention have been shown herein to be achieved in a convenient, economical and practical manner.

While we have shown and described what we regard to be the preferred embodiment of our invention, it will be appreciated that various changes, rearrangements and modifications may be made therein without departing from the scope of the invention, as defined by the appended claims.

We claim:

1. In an icemaker, in combination, an inclined freezing plate, means for flowing water over said plate for the formation thereon of a relatively thick slab of hard clear ice, a generally cylindrical housing integral with and extending along the lower edge of said plate, said housing having therein an elongate slot aligned with said plate for passage of water and the slab of ice, small holes for passage of water but not ice and larger holes at an elevated level on the wall portion thereof opposite said plate for passage of ice, and a crusher rotatably mounted in said housing for progressively crushing the slab of ice as it passes through said slot and for impelling the crushed ice toward said larger holes for discharge therethrough.

2. In an icemaker, in combination, an inclined freezing plate, means for flowing water over the upper surface of said plate for the formation thereon of a relatively thick slab of hard clear ice, means operative upon formation of the slab for releasing the slab from said plate for gravitational descent therealong, a generally cylindrical housing extending along the lower edge of said plate, said housing having therein an elongate slot aligned with the upper surface of said plate for passage of water and the slab of ice, small holes for passage of water but not ice and larger holes at an elevated level on the wall portion thereof opposite said plate for passage of ice, and a crusher rotatably mounted in said housing, said crusher including teeth for progressively crushing the slab of ice as it descends into said housing through said slot and at least one wiper strip engaging the cylindrical wall of said housing for impelling the ice crushed by said teeth toward said larger holes for discharge therethrough, said larger holes controlling the maximum size of the pellets of crushed ice discharged.

3. In an icemaker, in combination, an inclined freezing plate, means for flowing water over said plate for the formation thereon of a relatively thick slab of hard clear ice, means operative upon formation of the slab for defrosting said plate and thereby releasing the slab from said plate for gravitational descent therealong, a generally cylindrical housing secured to and extending along the lower edge of said plate, said housing having therein an elongate slot aligned with said plate for passage of water and the slab of ice, small holes for passage of water but not ice and larger holes at an elevated level on the wall portion thereof opposite said plate, a crusher rotatably mounted in said housing for progressively crushing the slab of ice as it passes through said slot and for impelling the crushed ice toward said larger holes for discharge therethrough, a water collecting assembly substantially coextensive with and disposed beneath said plate and said cylindrical housing, said water collecting assembly including a first trough aligned with and disposed beneath said cylindrical housing for collecting water therefrom, a second water trough communicating with the first and inclined wall portions beneath said inclined plate for draining condensation from said plate into said troughs when the plate is defrosted, a tube having an inlet end disposed adjacent but above the plate, said tube having an inlet in said end facing in the direction opposite the direction of water flow, said tube extending away from said plate and beyond the edge thereof and having an outlet spaced from said plate and discharging into said troughs, and control means in said tube adjacent said outlet for sensing the passage of water therethrough for controlling the icemaker independently of the ambient temperature immediately adjacent said plate, a storage hopper for crushed ice aligned with and disposed below said larger openings, said hopper having an opening of predetermined size at the lower end thereof, a housing on the lower end of said hopper having at its lower end an opening of substantially said predetermined size, said openings being offset from one another, a measuring block reciprocably mounted in said housing and having an opening therethrough of substantially said predetermined size, said block being reciprocably movable for selective alignment with the openings in said hopper and said housing, an agitator associated with said hopper for agitating the ice therein, and operating means for said measuring block and said agitator comprising sequentially operated elements for aligning the opening in said block with the opening in said hopper, for agitating the ice in the hopper thereby to fill the opening in said block, and for moving the block to align the opening therein with the opening in said housing for discharge of the ice in the block.

4. In an icemaker as set forth in claim 3, an ice and water sensing element disposed along the upper margin of said slot in said housing, and control means associated with said sensing element for independently controlling the icemaker.

5. In an icemaker having a freezing element, means for flowing water over the element to cause the formation of ice thereon and a common outlet for ice and water, the improvement comprising first and second sensing means for controlling the icemaker; said first sensing means comprising a tube having an inlet end disposed adjacent but spaced from the ice forming surface of the element and having an inlet in said end facing in the direction opposite the direction of water flow, said tube extending away from the element and having an outlet spaced from the element, and control means in said tube adjacent said outlet for sensing the passage of water therethrough for controlling the icemaker independently of the ambient temperature immediately adjacent the freezing element, said second sensing means comprising an ice and water sensing element adjacent the outlet spaced from the ice forming surface of the element by a distance slightly greater than the inlet end of said tube, and control means associated with said sensing element for independently controlling the icemaker.

6. In an icemaker, in combination, an inclined freezing plate, means for flowing water over said plate for the formation thereon of a relatively thick slab of hard clear ice, a crusher assembly extending along the lower edge of said plate for crushing the slab into pellets of hard clear ice, means operative upon formation of a relatively thick slab of ice for releasing the slab from said plate for gravitational descent therealong and for setting said crusher into operation, said last-named means including first sensing means disposed a predetermined distance above said plate for sensing formation of a slab of ice of predetermined thickness, and safety means operative upon formation of an excessively thick slab of ice for causing the icemaker to dispose of the excess, said safety means including ice and water sensing means disposed a greater distance above said plate than said first sensing means.

7. In an icemaker, in combination, an inclined freezing plate, means for flowing water over said plate for the formation thereon of a relatively thick slab of hard clear ice, a crusher assembly extending along the lower edge of said plate for crushing the slab into pellets of hard clear ice, and means operative upon formation of a relatively thick slab of ice for releasing the slab from said plate for gravitational descent therealong and for setting said crusher into operation, said last-named means including first sensing means disposed a predetermined distance above said plate adjacent the upper end thereof for sensing formation of a slab of ice of predetermined thickness and second sensing means comprising ice and water sensing means disposed a greater distance above said plate adjacent the inlet of said crusher assembly, said sensing means being coupled in parallel.

8. An ice crusher comprising a generally cylindrical housing having a slot along one of its sides for passage of large pieces of ice and a longitudinal row of sizing openings along its opposite side, ice crushing means rotatably mounted in said housing for breaking the large pieces of ice into pellets, wall means movable with said crushing means within said housing for impelling the pellets of ice toward and through said sizing openings, and sensing means along the upper edge of said slot for sensing the presence at said edge of ice and for causing continued operation of said ice crushing means during the presence of ice.

9. An ice crusher comprising a generally cylindrical housing having a slot along one of its sides for passage of slabs of ice and a sizing bar along its opposite side defining discharge openings for pellets of ice, ice crushing means rotatably mounted in said housing for crushing the slabs of ice into pellets, and wall means movable with said crushing means within said housing for impelling the pellets of ice toward and through said sizing bar.

10. In an icemaker, an inclined freezing plate and a generally cylindrical crusher assembly extending along the lower edge of said plate with its axis parallel to said edge at generally the level of said edge, said crusher assembly including a housing comprised of upper and lower partially cylindrical components, the lower one of which is integral with said plate, a sizing bar between said components at the side thereof opposite the plate per se, said sizing bar defining discharge openings at approximately the level of the housing axis, the upper housing component extending from said sizing bar toward said plate and terminating in upwardly spaced relation to the plate to define an inlet opening into the housing, and ice crushing means rotatably mounted in said housing.

11. In an icemaker, the integrated combination of an inclined freezing plate and a crusher assembly, said crusher assembly including housing component means integral with and extending along the lower edge of said plate, said housing component means including lower portions adjacent said plate having small holes therein for drainage of water and portions spaced from said plate extending upwardly from said lower portions and having larger holes therein at a location spaced from said plate and elevated relative to said lower portions for discharge from said assembly of relatively dry crushed ice.

References Cited in the file of this patent

UNITED STATES PATENTS

| | | |
|---|---|---|
| 743,686 | Buehne | Nov. 10, 1903 |
| 2,237,189 | McCormack | Apr. 1, 1941 |
| 2,721,452 | Brandin | Oct. 25, 1955 |
| 2,730,865 | Murdock | Jan. 17, 1956 |
| 2,746,262 | Gallo | May 22, 1956 |
| 2,886,954 | Battieger | May 19, 1959 |
| 2,952,988 | MacLeod | Sept. 20, 1960 |
| 2,962,869 | Bartels | Dec. 6, 1960 |
| 2,995,017 | Breeding | Aug. 8, 1961 |
| 3,003,327 | Cox | Oct. 12, 1961 |